United States Patent
Sreenivasan et al.

(10) Patent No.: US 10,838,700 B2
(45) Date of Patent: Nov. 17, 2020

(54) SYSTEM AND METHOD FOR SOFTWARE DEVELOPMENT

(71) Applicant: Aurigo Software Technologies Inc., Austin, TX (US)

(72) Inventors: Balaji Sreenivasan, Austin, TX (US); Kevin Koenig, Austin, TX (US); Ashish Kumar Agrawal, Austin, TX (US); Akila Harish, Bangalore (IN)

(73) Assignee: AURIGO SOFTWARE TECHNOLOGIES INC., Austin, TX (US)

( * ) Notice: Subject to any disclaimer, the term of this patent is extended or adjusted under 35 U.S.C. 154(b) by 0 days.

(21) Appl. No.: 16/382,240

(22) Filed: Apr. 12, 2019

(65) Prior Publication Data

US 2020/0326916 A1   Oct. 15, 2020

(51) Int. Cl.
*G06F 3/048* (2013.01)
*G06F 8/38* (2018.01)
*G06F 40/14* (2020.01)
*G06F 40/154* (2020.01)

(52) U.S. Cl.
CPC .............. *G06F 8/38* (2013.01); *G06F 40/14* (2020.01); *G06F 40/154* (2020.01)

(58) Field of Classification Search
CPC . G06F 3/00; G06F 3/014; G06F 3/048; G06F 8/38; G06F 17/22
See application file for complete search history.

(56) References Cited

U.S. PATENT DOCUMENTS

| | | | | |
|---|---|---|---|---|
| 6,845,499 B2* | 1/2005 | Srivastava | ............... | G06F 9/466 717/100 |
| 7,571,426 B2* | 8/2009 | Carroll, Jr. | ................ | G06F 8/38 717/104 |
| 7,631,291 B2* | 12/2009 | Shukla | ....................... | G06F 8/10 717/107 |
| 2004/0268229 A1* | 12/2004 | Paoli | ..................... | G06F 40/174 715/200 |
| 2006/0129605 A1* | 6/2006 | Doshi | ..................... | G06F 16/00 |
| 2008/0060009 A1* | 3/2008 | Kelts | .................. | H04N 21/4622 725/39 |
| 2012/0166977 A1* | 6/2012 | Demant | ..................... | G06F 8/38 715/762 |

* cited by examiner

*Primary Examiner* — Xiomara L Bautista

(57) ABSTRACT

A system for software application development comprises at least one processor configured to receive a declarative XML file defining the user interface and the database structure in one integrated file. The processor generates a database schema, user interface, API definition, PDF reports, data export/import using excel. Additionally, the processor automatically enables our unified native mobile application supporting an offline mode. The processor can render any number of extensible formats, including HTML, JSON, XML, and XML schema. On receiving a request, the processor dynamically generates output from the declarative XML file enabling hot and real-time deployment.

10 Claims, 16 Drawing Sheets

400

```
| Employee Form |
┌─────────────┐
│ 💾  ⊗       │
│Save Cancel  │
│  General    │
└─────────────┘

Employee Details

Name : [                    ]

Designation : [                    ]

Date OF Birth : [          ][∨]
```

FIG. 4A

Display   Instructions or any static text can be displayed here.

FIG. 4B

Text box

FIG. 4C

Text area

FIG. 4D

Date   11/14/2018  ▽

November 2018
< November ▽   2018 ▽ >

| Sun | Mon | Tue | Wed | Thu | Fri | Sat |
|---|---|---|---|---|---|---|
| 28 | 29 | 30 | 31 | 1 | 2 | 3 |
| 4 | 5 | 6 | 7 | 8 | 9 | 10 |
| 11 | 12 | 13 | [14] | 15 | 16 | 17 |
| 18 | 19 | 20 | 21 | 22 | 23 | 24 |
| 25 | 26 | 27 | 28 | 29 | 30 | 1 |
| 2 | 3 | 4 | 5 | 6 | 7 | 8 |

Today: 11/14/2018

FIG. 4E

Numeric                              0.00

FIG. 4F

Check box list ☐ Option 1 ☐ Option 2 ☐ Option 3 ☐ Option 4

Welcome User Please follow the below instructions.

- Fill all fields
- Please upload document

General Details

Name

DOB  11/15/2018

FIG. 5A

Employee Details

First Name

Last Name

Department  Product

Designation  Software Engineer

FIG. 5B

Certifications

| Name | Date | Comments |
|---|---|---|

No records to display

Add  Edit  Delete

FIG. 5C

| Static Grid | |
|---|---|
| Column 1 | Column 2 |
|  |  ▽ |
| 11/15/2018 ☑ |  |
| 0.00 |  |

FIG. 5D

| Checklist Group | | | | |
|---|---|---|---|---|
| Compliance | A | B | C | Comments |
| Checklist Description | ○ | ○ | ○ |  |
| Checklist Description | ○ | ○ | ○ |  |
| Checklist Description | ○ | ○ | ○ |  |
| Checklist Description | ○ | ○ | ○ |  |

FIG. 5E

|   | Column_name | Type | Computed | Length | Prec | Scale | Nullable |
|---|---|---|---|---|---|---|---|
| 1 | ID | int | no | 4 | 10 | 0 | no |
| 2 | AUR_ModifiedBy | nvarchar | no | 4000 |   |   | yes |
| 3 | AUR_ModifiedOn | datetime | no | 8 |   |   | yes |
| 4 | Name | nvarchar | no | -1 |   |   | yes |
| 5 | Designation | nvarchar | no | -1 |   |   | yes |
| 6 | DOB | datetime | no | 8 |   |   | yes |
| 7 | AUR_Timestamp | uniquei... | no | 16 |   |   | no |
| 8 | AUR_RecordID | uniquei... | no | 16 |   |   | yes |

SYSTEM AND METHOD FOR SOFTWARE DEVELOPMENT

BACKGROUND

Unless otherwise indicated herein, the materials described in this section are not prior art to the claims in this application and are not admitted to being prior art by inclusion in this section.

Field of the Invention

The subject matter in general relates to the field of software development. More particularly, but not exclusively, the subject matter relates to a framework for rapid software development.

Discussion of the Related Art

Generally, software applications are developed using imperative languages. Software developers may write code for several components of an application to enable desired functionality. In certain scenarios, the code is application specific and may require enormous amount of code to be written, thereby leading to complexity in the development process. Further, the code tends to be specific to applications, and software developers find it cumbersome to modify or expand the codes written, thereby adding to the time involved in software development.

While there are challenges involved in developing new software or making changes to existing code, there are challenges involved in deploying new or modified software. Generally, the code that is developed or modified need to be compiled, and one or more instances of the server may require restarting to reflect changes. Such aspects of deployment add to the time involved in deploying software. Further, the downtime involved during deployment may negatively affect the end users of the software application.

In view of the forgoing discussion, there is a need for a technical solution to improve software application development and deployment process.

SUMMARY

In one aspect a system is provided for software application development. The system comprises at least one processor configured to receive a declarative XML file defining at least a structure of a user interface form. The processer may enable storage of the declarative XML file in a digital repository. Further, the processor may receive a request to render the user interface form on a client device. On receiving the request, the processor may generate the user interface form by referring to the declarative XML file, at each instance request is received to render the user interface form.

In another aspect a method is provided for software application development. The method comprises receiving a declarative XML file defining at least a structure of a user interface form and storing the declarative XML file in a digital repository. The method further comprises receiving a request to render the user interface form on a client device, and in response rendering the user interface form by referring to the declarative XML file, at each instance request is received to render the user interface form.

BRIEF DESCRIPTION OF DRAWINGS

Embodiments are illustrated by way of example and not limitation in the figures of the accompanying drawings, in which like references indicate similar elements and in which:

FIG. 4A illustrates an example form UI 400 having been rendered on a web interface, in accordance with an embodiment;

FIG. 4B illustrates an example UI representation of display any static text in the form, in accordance with an embodiment;

FIG. 4C illustrates an example UI representation of display of a simple text input field in the form, in accordance with an embodiment;

FIG. 4D illustrates an example UI representation of display of multi-line text input in the form, in accordance with an embodiment;

FIG. 4E illustrates an example UI representation of display of date selection calendar in the form, in accordance with an embodiment;

FIG. 4F illustrates an example UI representation of display of numeric decimals input field in the form, in accordance with an embodiment;

FIG. 5A illustrates an example UI representation of section layout having one column and 'n' rows of controls in the form, in accordance with an embodiment;

FIG. 5B illustrates an example UI representation of two column layout in the form, in accordance with an embodiment;

FIG. 5C illustrates an example UI representation of a sub table that can have rows added by user input in the form, in accordance with an embodiment;

FIG. 5D illustrates an example UI representation of predefined finite set of rows and columns, having data input and output control in each cell, in accordance with an embodiment;

FIG. 5E illustrates an example UI representation of a set of activities that must be performed in sequence to meet a requirement in the form, in accordance with an embodiment;

FIG. 6 illustrates a table structure created by a framework engine 106 for a sample form, in accordance with an embodiment;

FIG. 7B illustrates a list page of the sample XML, in accordance with an embodiment;

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Figure 1:
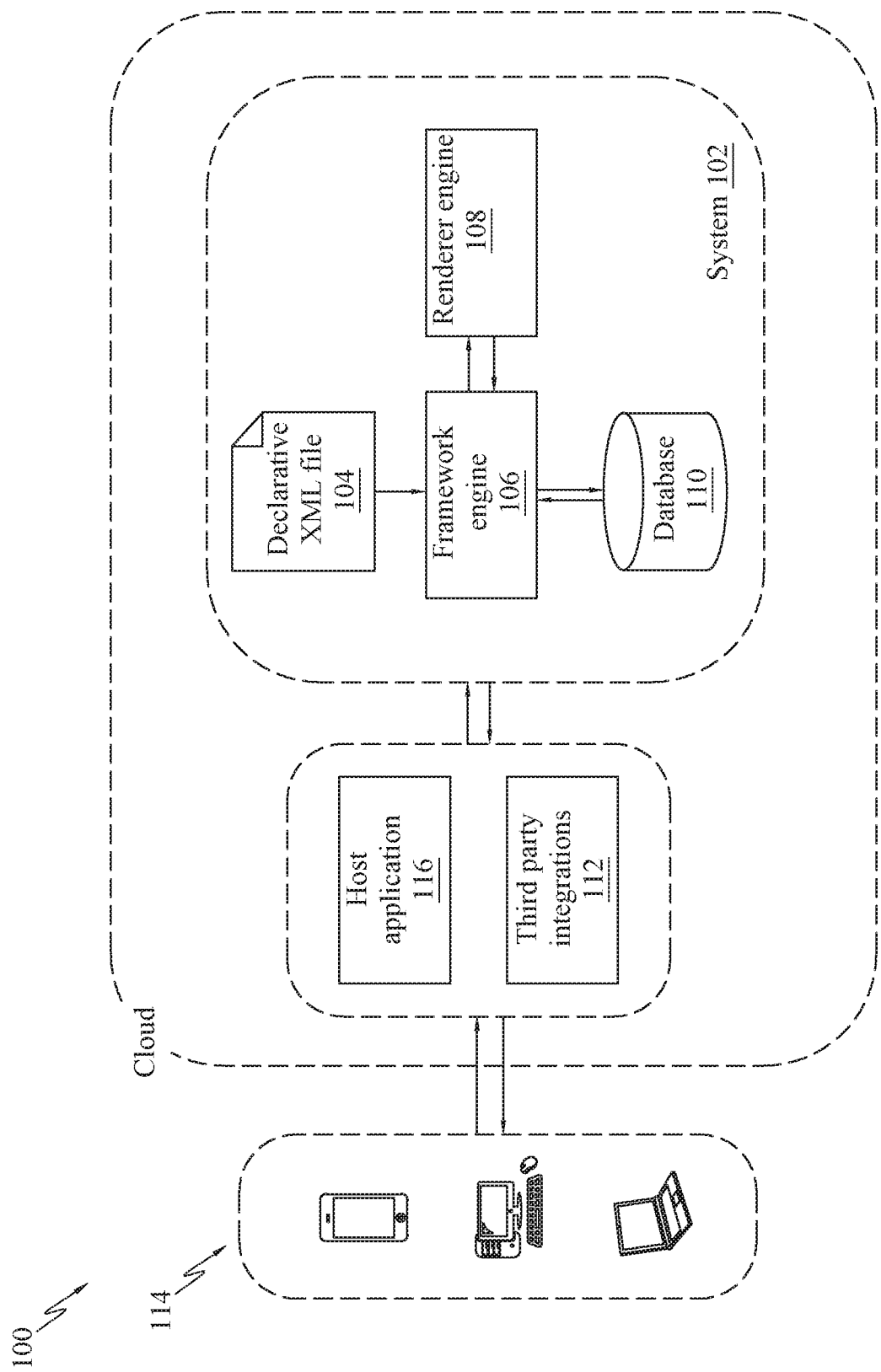
FIG. 1 illustrates a framework 100 for enabling rapid software development and deployment, in accordance with an embodiment.

Referring to FIG. 1, a framework 100 is disclosed for enabling rapid software development and deployment. The framework 100 includes a system 102, a host application 116, third party integrations 112 and client devices 114. The system 102 includes a framework engine 106, a renderer engine 108 and a database 110. The framework engine 106 uses declarative XML files 104 as an input.

As an overview, a form may need to be made available by a host application 116 to client devices 114. A declarative XML file 104 defining the structure of the form UI and database, and validations, may be received as an input by the framework engine 106. The framework engine 106 renders the form UI in the host application 100 by referring to the declarative XML file 104 to capture input from users provided via the client devices 114. Further, the framework engine 106 may create SQL table, as per the declarative XML file 104, to persist the data captured. Furthermore, the framework engine 106 may generate SQL query to perform the CRUD [Create, Read, Update, and Delete] operations. The framework engine 106 may also render various types of output in various formats using the renderer engine 108, import and export the data using spreadsheet.

Figure 2:
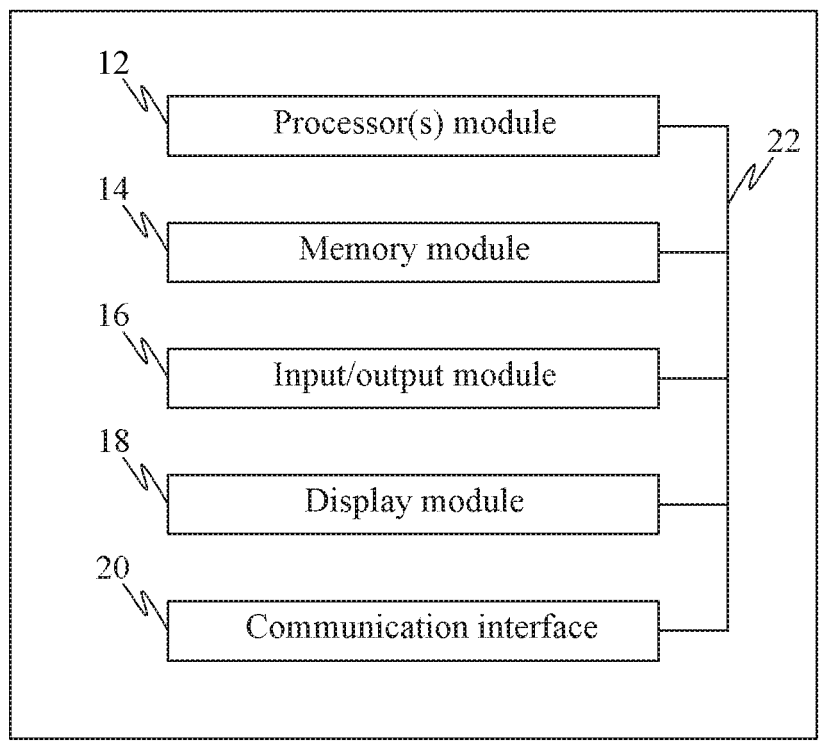
FIG. 2 illustrates a cloud infrastructure in which a system 102 of the framework 100 may be hosted, in accordance with an embodiment.

The system 102 may be hosted on a cloud infrastructure within ASP.NET web application as an example, and so can be the host application 116 and third-party integrations 112. An example cloud infrastructure, which can be one or more servers, in which the system 102 may be hosted is discussed with reference to FIG. 2. The infrastructure may include processor(s) module 12, a memory module 14, an input/output module 16, a display module 18, a communication interface 20 and a bus 22 interconnecting all the modules of the system 100.

The processor(s) module 12 may implemented in the form of one or more processors and may be implemented as appropriate in hardware, computer executable instructions, firmware, or combinations thereof. Computer-executable instruction or firmware implementations of the processor(s) module 12 may include computer-executable or machine-executable instructions written in any suitable programming language to perform the various functions described. The instructions that may enable the functionality of the system 102 may be executed by the processor(s) module 12.

The memory module 14 may include a permanent memory such as hard disk drive, may be configured to store data, and executable program instructions that are implemented by the processor(s) module 12. The memory module 14 may be implemented in the form of a primary and a secondary memory. The memory module 14 may store additional data and program instructions that are loadable and executable on the processor(s) module 12, as well as data generated during the execution of these programs. Further, the memory module 14 may be a volatile memory, such as a random access memory and/or a disk drive, or a non-volatile memory. The memory module 14 may comprise of removable memory such as a Compact Flash card, Memory Stick, Smart Media, Multimedia Card, Secure Digital memory, or any other memory storage that exists currently or may exist in the future. The memory module may enable storage of the database 110 of the system 102.

The input/output module 16 may provide an interface for input devices such as computing devices, keypad, touch screen, mouse, and stylus among other input devices; and output devices such as speakers, printer, and additional displays among others. The input/output module 16 may be used to receive data or send data through the communication interface 20.

The display module 18 may be configured to display content. The display module 18 may also be used to receive input. The display module 18 may be of any display type known in the art, for example, Liquid Crystal Displays (LCD), Light Emitting Diode (LED) Displays, Cathode Ray Tube (CRT) Displays, Orthogonal Liquid Crystal Displays (OLCD) or any other type of display currently existing or which may exist in the future.

The communication interface 20 may include a modem, a network interface card (such as Ethernet card), a communication port, and a Personal Computer Memory Card International Association (PCMCIA) slot, among others. The communication interface 20 may include devices supporting both wired and wireless protocols. Data in the form of electronic, electromagnetic, optical, among other signals may be transferred via the communication interface 20.

Figure 3:
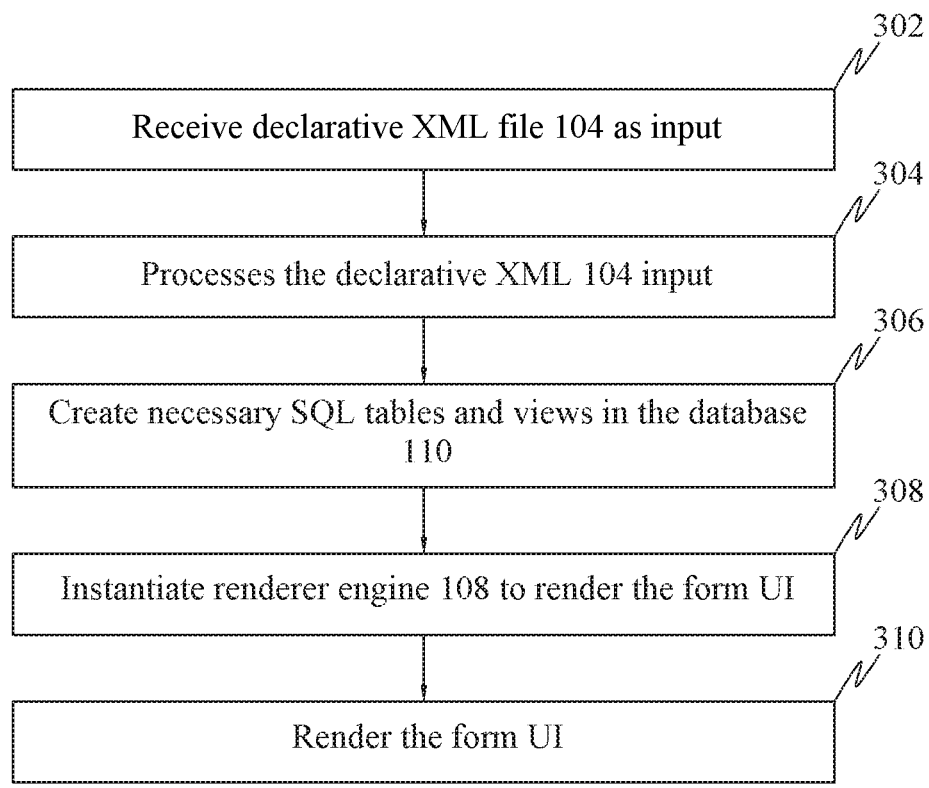
FIG. 3 is a flowchart illustrating a method performed by the system 102, in accordance with an embodiment.

Referring now to the flow chart in FIG. 3, the system 102 uses declarative XML file 104 to enable various functionalities. At step 302, a declarative XML file 104 is received as an input by the framework engine 106. The declarative XML file 104 may include declarative XML based language which the framework engine 106 comprehends. The declarative XML file 104 may define the structure of the UI, database and other business validations. This declarative XML file 104 may also include information required to render the list and details UI, create SQL tables and views, generate reports, PDF and prepare to import and export data using spreadsheet, as an example.

Below discussed is an example declarative XML file 104 for a simple employee form, which captures details like name, designation and date of birth. This would include definition of the structure for rendering of the form UI, which is based on the declarative XML file 104.

```
<Form
  Name="EMPFORM"
  TableName="EmployeeDetails"
  PrimaryKeyName="ID"
  Header="Employee Form"
  ModuleID="LIBRARY"
  ParentModuleID="LIBRARY">
  <Section Name="HiddenSection" Attributes="display: none"
    Caption="">
    <Control Name="ID" Caption="ID" DBType="Int
      Identity(1,1)"
PrimaryKey="true" Type="Hidden"/>
    <Control Name="AUR_ModifiedBy"   Caption="ModifiedBy"
DBType="nvarchar(2000)" Type="Hidden"
Value="{CURRENTUSERNAME}"
ReEvaluate="true" />
    <Control Name="AUR_ModifiedOn"   Caption="ModifiedOn"
DBType="datetime"  Type="Hidden"
Value="{CURRENTDATETIME}"
ReEvaluate="true" />
  </Section>
  <Section Name="EmployeeDetailsSection" Caption="Employee
    Details">
    <Control   Name="Name"   Caption="Name  :"
      DBType="nvarchar(max)"
ReportWidth="2.5" Type="TextBox" />
    <Control   Name="Designation"   Caption="Designation  :"
DBType="nvarchar(max)" ReportWidth="2.5" Type="TextBox" />
    <Control   Name="DOB"   Caption="Date  Of  Birth  :"
      DBType="datetime"
```

Format="Date" ReportWidth="2.5" Type="Date" />
  </Section>
  <ListColumns Columns="Name,Designation,DOB" Type="Visible" />
</Form>

In the above example, <Form> is the root element of the XML. This element provides basic information for the renderer engine 108 and the framework engine 106 to perform their operations.

| Attribute | Description |
| --- | --- |
| Name | A unique identifier for the form. This may be 7 characters. |
| TableName | SQL table which the engine 106 creates and uses it to perform the CRUD operations. |
| PrimaryKeyName | The primary key column name of the form table. |
| Header | Text to be displayed as header to the form. |
| ModuleID | Module ID is the 7 characters of another form or module (packages) which will manage the permission of the form being created. |
| ParentModuleID | Module ID is the 7 characters of another form or module (packages) under which the form will be rendered in the UI. |

The declarative XML file 104 may identify a second form UI and data corresponding to a field in the second form UI, which has to be rendered in the form UI.

The <Section> element behaves like a div object in HTML. It provides an enclosure for all controls. There can be more than one section in a form. Sections can include other sections 'n' levels deep, and sections can include controls.

| Attribute | Description |
| --- | --- |
| Name | The unique identifier for the section. |
| Attributes | Direct pass through to the style attribute of the div element or container of the final XML file. This attribute can be used for many things such as coloring the background of a div object. |
| Caption | Displays a Section Header at the top of the panel if specified. |

The <Control> element is used for all data display in the system. The control provides for data input and corresponding database type and name must be specified. This information will be used to create the required SQL tables.

| Attribute | Description |
| --- | --- |
| Name | The unique identifier for the control. This may also be the column name in the SQL table. |
| Caption | Displays a control before rendering the control. |
| Type | Type of the control to be rendered. Examples are TextBox, TextArea, Date and DropDownList, among others. |
| DBType | Standard Database Field types supported by SQL Server 2005 and above. This may be coordinated with the 'Type' attribute above. |

The <ListColumns> element is used to specify the columns which need to be displayed in the list page.

| Attribute | Description |
| --- | --- |
| Columns | List of Column names separated by a comma which may be displayed on the form's list page |

-continued

| Attribute | Description |
|---|---|
| Type | Hidden - This may show all the columns from the table other than the ones mentioned in Columns attributes.<br>Visible-This may show only those columns mentioned in the Columns attribute. |

Moving on, at step 304, the framework engine 106 processes the declarative XML 104 input. As a result of said processing, the framework engine 106, at step 306, creates the necessary SQL tables and views in the database 110. Further, at step 308, instantiates the renderer engine 108 to render the form. The framework engines 106 may also take care of CRUD (Create, Retrieve, Update and Delete) operations.

The renderer engine 108, as an example, renders the form UI in the host application 116, at step 310. It shall be noted that, renderer engine 108 generate or renders the form UI by referring to the declarative XML file 104, at each instance request is received, for example by a client device 114 via the host application 116, to render the form UI. In other words, the code or the XML file 104 is not compiled, instead each time the form UI has to be rendered, the same is created by referring to the XML file 104. Such a feature allows for hot deployment of the new or modified software. The system 102 may store all the declarative XML files 104 required for rendering or creating various forms UI in a digital repository. FIG. 4A illustrates an example form UI 400 having been rendered on a web interface.

In an embodiment, as discussed earlier, the declarative XML file 104 may identify a second form UI and data corresponding to a field in the second form UI, which has to be rendered in the form UI. The renderer engine 108 may refer to the declarative XML file of the second form UI and the table corresponding to the second form UI to render data corresponding to a field of the second form UI in the form UI currently being rendered.

An example list of XML and the corresponding UI representation of various controls enabled by the system 102 or the renderer engine 108 is discussed below.

Example XML that enables the form to submit/post data to server, which is not visible to the end user is provided below.

```
<Control Name="HiddenColumn" Caption="Hidden"
DBType="nvarchar(max)"
Type="Hidden"/>
```

Example XML that enables display any static text in the form is provided below, and the corresponding UI representation is shown in FIG. 4B.

```
<Control Name="DisplayColumn" Caption="Display"
DBType="nvarchar(max)"
Type="Display" Value="Instructions or any static text can be displayed
here." />
```

Example XML that enables a simple text input field, which can be used to capture alpha numeric characters is provided below, and the corresponding UI representation is shown in FIG. 4C.

```
<Control Name="TextBoxColumn" Caption="Text box"
DBType="nvarchar(max)" Type="TextBox" />
```

Example XML that enables a multi-line text input control, which can be used to capture alpha numeric characters is provided below, and the corresponding UI representation is shown in FIG. 4D.

```
<Control Name="TextAreaColumn" Caption="Text area"
DBType="nvarchar(max)" Type="TextArea" />
```

Example XML that enables capture of date in the form by showing a date selection calendar is provided below, and the corresponding UI representation is shown in FIG. 4E.

```
<Control Name="DateColumn" Caption="Date" DBType="datetime"
Format="Date" Type="Date" />
```

Example XML that enables numeric decimals input is provided below, and the corresponding UI representation is shown in FIG. 4F.

```
<Control Name="NumericColumn" Caption="Numeric"
DBType="numeric(18,4)" Type="Numeric" />
```

Figure 4G:
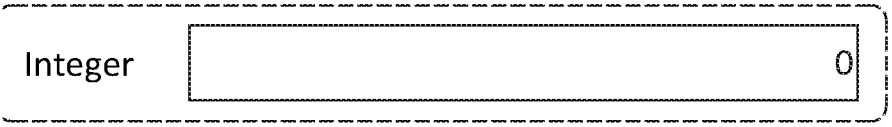
FIG. 4G illustrates an example UI representation display of integer input filed in the form, in accordance with an embodiment.

Example XML that enables integer input is provided below, and the corresponding UI representation is shown in FIG. 4G.

```
<Control Name="IntegerColumn" Caption="Integer" DBType="int"
Type="Integer" />
```

Figure 4H:
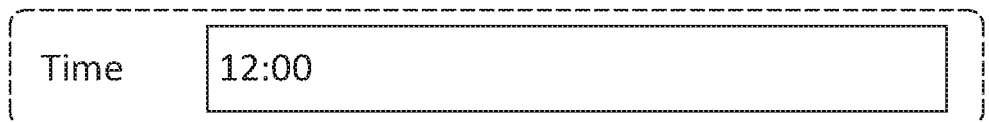
FIG. 4H illustrates an example UI representation display of time input field in the form, in accordance with an embodiment.

Example XML that enables capture of time input in 24 hours format is provided below, and the corresponding UI representation is shown in FIG. 4H.

```
<Control Name="TimeColumn" Caption="Time" DBType="time"
Type="TimeInput" />
```

Figure 4I:
FIG. 4I illustrates an example UI representation display of images input control in the form, in accordance with an embodiment.

Example XML that enables display images inside the form is provided below, and the corresponding UI representation is shown in FIG. 4I.

```
<Control Height="100px" Width="200px"
Name="PictureColumn"
Caption="Picture" Type="Picture"
Value="https://www.aurigo.com/wp-
content/uploads/2015/12/logomain.png" />
```

Figure 4J:
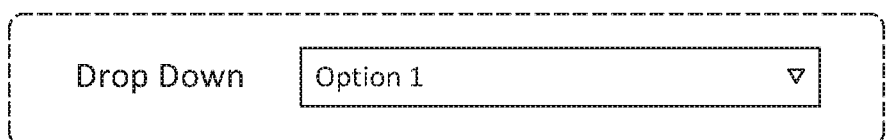
FIG. 4J illustrates an example UI representation of display of provision for selection of a single item from a list in the form, in accordance with an embodiment.

Example XML that enables selection of a single item from a list of available items is provided below, and the corresponding UI representation is shown in FIG. 4J.

```
<Control Name="DropDownColumn" Caption="Drop Down"
DBType="nvarchar(max)" ListItems="Option 1:Option 1;Option 2:Option
2"
Type="DropDownList" />
```

Figure 4K:
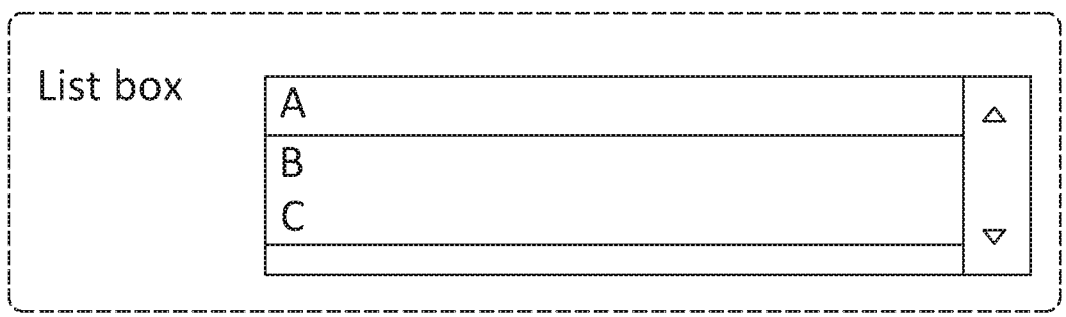
FIG. 4K illustrates an example UI representation of display of provision to select multiple items from the list in the form, in accordance with an embodiment.

Example XML that allows the user to select multiple items from the list of available items is provided below, and the corresponding UI representation is shown in FIG. 4K.

```
<Control Name="ListboxColumn" Caption="List box"
DBType="nvarchar(max)"
ListItems="A:0;B:1;C:2;D:4;E:5" Type="Listbox" />
```

Figure 4L:
FIG. 4L illustrates an example UI representation of display of provision for selection of a check box in the form, in accordance with an embodiment.

Example XML that enables selection of a check box is provided below, and the corresponding UI representation is shown in FIG. 4L.

```
<Control Name="CheckBoxColumn" Caption="Check box"
DBType="bit"
Type="CheckBox" />
```

Figure 4M:
FIG. 4M illustrates an example UI representation of display of provision for selection of one of the provided options using radio buttons in the form, in accordance with an embodiment.

Example XML that enables selection of one of the provided options using radio buttons is provided below, and the corresponding UI representation is shown in FIG. 4M.

```
<Control Name="RadioButtonColumn" Caption="Radio Button"
DBType="nvarchar(max)" ListItems="Yes:Y;No:N"
Type="RadioButtonList" />
```

Figure 4N:
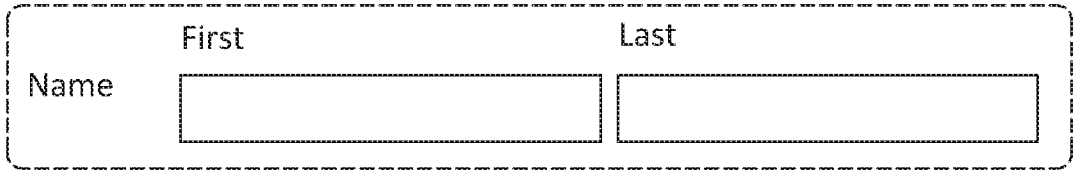
FIG. 4N illustrates an example UI representation of display of more than one control one next to other in the form, in accordance with an embodiment.

Example XML that enables the user to render more than one control one next to other is provided below, and the corresponding UI representation is shown in FIG. 4N.

```
<Control Name="SetControl" Caption="Name" Type="Set">
    <Control Name="FirstNameColumn" Caption="First"
DBType="nvarchar(max)" Type="TextBox" />
    <Control Name="LastNameColumn" Caption="Last"
DBType="nvarchar(max)" Type="TextBox" />
</Control>
```

Figure 4O:
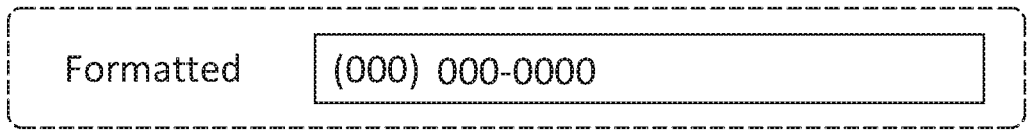
FIG. 4O illustrates an example UI representation of display of provision for data entry in a predefined format in the form, in accordance with an embodiment.

Example XML that enables data entry in a predefined format is provided below, and the corresponding UI representation is shown in FIG. 4O.

```
<Control Name="FormattedColumn" Caption="Formatted"
DBType="nvarchar(max)" Format="(###) ###-####" Type="Formatted" />
```

Figure 4P:
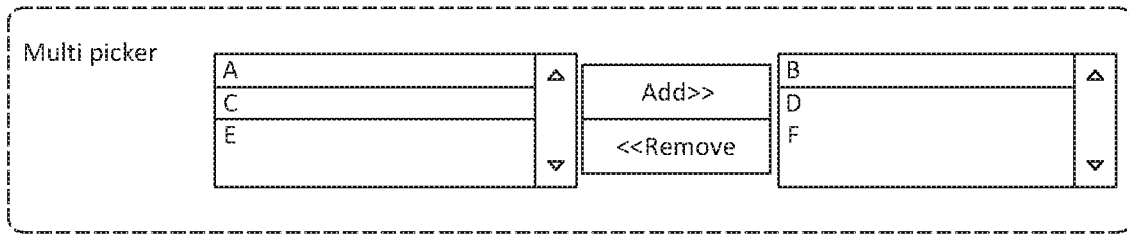
FIG. 4P illustrates an example UI representation of display of provision for the user to select one or more items from a list in the form, in accordance with an embodiment.

Example XML that enables the user to select one or more items from a list of available values is provided below, and the corresponding UI representation is shown in FIG. 4P.

```
<Control Name="MultiPickerColumn" Caption="Multi picker"
DBType="nvarchar(max)" ListItems="A:1;B:2;C:3;D:4;E:5;F:6"
Type="MultiPicker" />
```

Figure 4Q:
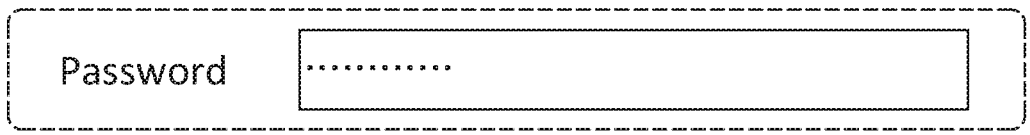
FIG. 4Q illustrates an example UI representation of display of password input field in the form, in accordance with an embodiment.

Example XML that enables password as input is provided below, and the corresponding UI representation is shown in FIG. 4Q.

```
<Control Name="PasswordColumn" Caption="Password"
DBType="nvarchar(max)" Type="Password" />
```

Figures 4R, 4S, 4T:
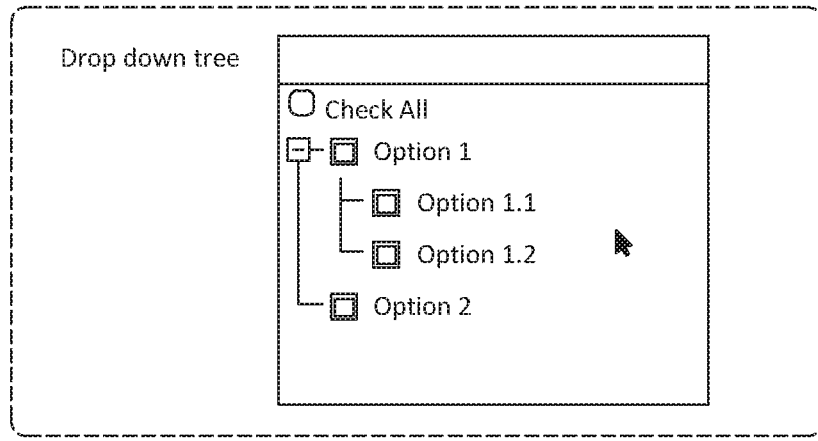
FIG. 4R illustrates an example UI representation of display of check boxes to select values in the form, in accordance with an embodiment.
FIG. 4S illustrates an example UI representation of display of provision for uploading of documents with the form, in accordance with an embodiment.
FIG. 4T illustrates an example UI representation of display of data in a tree format in the form, in accordance with an embodiment.

Example XML that enables check boxes to select values is provided below, and the corresponding UI representation is shown in FIG. 4R.

```
<Control Name="CheckBoxListColumn" Caption="Check box list"
DBType="nvarchar(max)" ListItems="Option 1:1;Option 2:2;Option 3:3;Option 4:4" Type="CheckBoxList" />
```

Example XML that generates identifier for a form is provided below.

```
<AutoIncrement Name="AutoIncrementColumn" Caption="Auto increment"
DBType="nvarchar(500)" Type="AutoIncrement" Prefix="Record-"
Seed="1" Interval="1" />
```

Example XML that enables uploading of documents with the form's data is provided below, and the corresponding UI representation is shown in FIG. 4S.

```
<AttachmentControl Name="Attachment" Caption="Attachment"
Type="AttachmentControl" ModuleId="ATTCHMT" />
```

Example XML that shows the data in the tree format and the user can choose on or more items from the selected values is provided below, and the corresponding UI representation is shown in FIG. 4T.

```
<Control Name="DropDownTreeColumn" Caption="Drop down tree"
DBType="nvarchar(max)" ListItems="1,[_DBNULL_],Option 1;2,1,Option 1.1;3,1,Option 1.2;4,[_DBNULL_],Option 2"
Type="DropDownTreeDataControl" EnableMultiSelect="true" />
```

Figure 4U:
FIG. 4U illustrates an example UI representation of display of provision to select date and time together in the form, in accordance with an embodiment.

Example XML that allows the user to select date and time together is provided below, and the corresponding UI representation is shown in FIG. 4U.

```
<Control Name="DateTimeColumn" Caption="Date and Time"
DBType="datetime" Type="DateTime" />
```

Figure 4V:
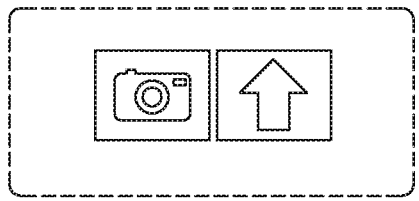
FIG. 4V illustrates an example UI representation of display of provision to upload or take new photos in the form, in accordance with an embodiment.

Example XML that allows the user to either upload or take new photos using the device camera is provided below, and the corresponding UI representation is shown in FIG. 4V.

```
<Control Name="PictureTaker" Caption="Take picture"
DOType="nvarchar(max)" Type="PictureTaker" />
```

Figure 4W:
FIG. 4W illustrates an example UI representation of display of HTML based text to the end user in the form, in accordance with an embodiment.

Example XML that shows HTML based text to the end user is provided below, and the corresponding UI representation is shown in FIG. 4W.

```
<Text Name="InstructionText">
    <Markup>
        <p>
            Welcome <strong>User </strong>Please follow the below
            instructions.
        </p>
        <ul>
            <li>Fill all fields </li>
            <li>Please upload document</li>
        </ul>
    </Markup>
</Text>
```

Having discussed about the controls provided by XML and comprehended by the renderer engine 108. We now move on to example list of XML and the corresponding UI representation of various controls containers enabled by the system 102 or the renderer engine 108.

In an embodiment, "sections" provides enclosure to all the controls. There can be more than one section in a form and they can be nested inside sections.

Example XML for a simple section layout having one column and 'n' rows of controls is provided below, and the corresponding UI representation is shown in FIG. 5A.

```
<SectionName="GeneralDetailsSection" Caption="General Details">
    <Control Name="Name" Caption="Name" DBType="nvarchar(max)" Type="TextBox" />
    <Control Name="DOB" Caption="DOB" DBType="datetime" Format="Date" Type="Date" />
</Section>
```

Example XML for a two column layout is provided below, and the corresponding UI representation is shown in FIG. 5B.

```
<Section Name="EmployeeDetailsSection" Caption="Employee Details" Orientation="Horizontal">
    <Section Name="EmployeeDetailsI1Section" Caption="">
        <Control Name="FirstName" Caption="First Name" DBType="nvarchar(200)" Type="TextBox" />
        <Control Name="Department" Caption="Department" DBType="int" ListItems="Product:1;Sales:2;Marketing :3" Type="DropDownList" />
    </Section>
    <Section Name="EmployeeDetailsI2Section" Caption="">
        <Control Name="LastName" Caption="Last Name" DBType="nvarchar(200)" Type="TextBox" />
        <Control Name="Designation" Caption="Designation" DBType="int" ListItems="Software Engineer:1;Senior Software Engineer:2;Lead:3;Manager:4" Type="DropDownList" />
    </Section>
</Section>
```

In an embodiment, "DynamicGrid" provides for a sub table that can have rows added by user input. When using DynamicGrid the user is presented with inline 'add', 'delete', 'edit' buttons that control data entry into the grid (refer FIG. 5C).

```
<DynamicGrid Name="DGCertification" TableName="Certifications" PrimaryKeyName="CertificationID" Caption="Certifications" >
    <Column Name="CertificationID" DBType="Int Identity(1,1)" PrimaryKey="true" Type="Hidden" />
    <Column Name="EmpID" DBType="Int" ForeignKey="true" Hidden="true" Type="Hidden" />
    <Column Name="CertificationName" Caption="Name" DBType="nvarchar(200)" Type="TextBox" />
    <Column Name="CertificationDate" Caption="Date" DBType="datetime" Type="Date" />
    <Column Name="CertificationComments" Caption="Comments" DBType="nvarchar(max)" Type="TextArea" />
</DynamicGrid>
```

In an embodiment, "StaticGrid" element creates a pre-defined finite set of rows and columns, having data input and output control in each cell. Different cells in a column can have different type of controls. Refer. FIG. 5D.

```
<StaticGrid Name="StockPileFineIndividual" TableName="StockPileFineIndividual" PrimaryKeyName="ID" Caption="Stock Pile">
    <Header>
        <Column Name="ID" DBType="Int Identity(1,1)" PrimaryKey="true" Type="Hidden" />
        <Column Name="FID" DBType="Int" ForeignKey="true" Hidden="true" Type="Hidden" />
        <Column Name="SieveSize" Caption="Sieve Size" DBType="Varchar(200)" Type="Column" />
        <Column Name="IndividualMassRetained" Caption="Individual Mass Retained g (MR)" DBType="numeric(18,4)" Type="Column" />
        <Column Name="IndividualPercentRetained" Caption="Individual Percent Retained" DBType="numeric(18,4)" Type="Column" />
        <Column Name="CalcPercentPassingPP" Caption="Calc'd Percent Passing (PP)" DBType="numeric(18,4)" Type="Column" />
        <Column Name="ReportedPercentPassing" Caption="Reported Percent Passing (RPP)" DBType="int" Type="Column" />
    </Header>
    <Row Name="Row_1">
        <Column Name="SieveSize1" DBType="nvarchar(max)" Type="Display" Value="3/8 inch" />
        <Column Name="IndividualMassRetained1" Type="Numeric"/>
        <Column Name="IndividualPercentRetained1" DBType="Numeric(18,4)" Type="TextBox" />
        <Column Name="CalcPercentPassingPP1" DBType="Numeric(18,4)" Type="TextBox" />
        <Column Name="ReportedPercentPassing1" DBType="int" Type="Integer" />
    </Row>
    <Row Name="Row_2">
        <Column Name="SieveSize2" DBType="nvarchar(max)" Type="Display" Value="No. 4" />
        <Column Name="IndividualMassRetained2" DBType="numeric(18,4)" Type="Numeric"/>
```

```
        <Column  Name="IndividualPercentRetained2"  DBType="Numeric(18,4)"
Type="TextBox" />
        <Column  Name="CalcPercentPassingPP2"  DBType="Numeric(18,4)"
Type="TextBox" />
        <Column  Name="ReportedPercentPassing2"  DBType="int"
Type="Integer"/>
      </Row>
   </StaticGrid>
```

In an embodiment "checklist group" is a container where you can define a set of activities that must be performed in sequence to meet the requirement. All these check lists may have same set of input controls known as "options" for the checklist. Refer FIG. 5E.

```
<CheckListGroup TableName="CheckList" Caption="Check List" >
    <Option  Name="Status"  Type="RadioButtonList"
ListItems="OK:1;Not OK:0" DBType="Int"/>
    <Option Name="Notes" Type="TextArea"
DBType="Varchar(4000)"/>
  <Group  Caption="Checklist"  Name="CL2"
Attributes="width:600px;float:Middle;" >
       <CheckList Description="Main Door (inc. fittings)"
       Width="300px"/>
       <CheckList Description="Bed Room Door 1" />
       <CheckList Description="Bed Room Door 2" />
       <CheckList Description="Bed Room Door 3" />
       <CheckList Description="Toilet Door 1" />
       <CheckList Description="Toilet Door 2" />
       <CheckList Description="Toilet Door 3" />
       <CheckList Description="Windows all items" />
       <CheckList Description="Internal Painting" />
       <CheckList Description="Doors Painting" />
       <CheckList Description="windows Painting" />
       <CheckList Description="Toilet flooring & Dadoing" />
       <CheckList Description="Kitchen Dadoing" />
       <CheckList Description="Kitchen platform" />
       <CheckList Description="Plumbing Fitting - Toilet 1" />
       <CheckList Description="Plumbing Fitting - Toilet 2" />
       <CheckList Description="Plumbing Fitting - Toilet 3" />
       <CheckList Description="Plumbing Fitting - Kiitchen" />
       <CheckList Description="Plumbing Fitting - Wash Area" />
       <CheckList Description="Electrical Items - Switchs" />
       <CheckList Description="Electrical Items - Sockets" />
       <CheckList Description="Electrical Items - MCBs" />
   </Group>
</CheckListGroup>
```

Having discussed the UI resulting from the declarative XML file 104, we now discuss the creation of table and views in the database 110 based on the declarative XML file 104. In an embodiment, the declarative XML file 104 may be published in the host application 116. Once published, the framework engine 106 may create a table and view as per the structure defined in the declarative XML file 104. An example table structure created by the framework engine 106 for a sample form is illustrated in FIG. 6. The framework engine 106 may be configured to persist the data and save the data in the table.

Moving on to the renderer engine 108, in an embodiment, the renderer engine 108 takes the declarative XML file 104 as input through the framework engine 106 and renders the XML in the desired format.

Figure 7A:
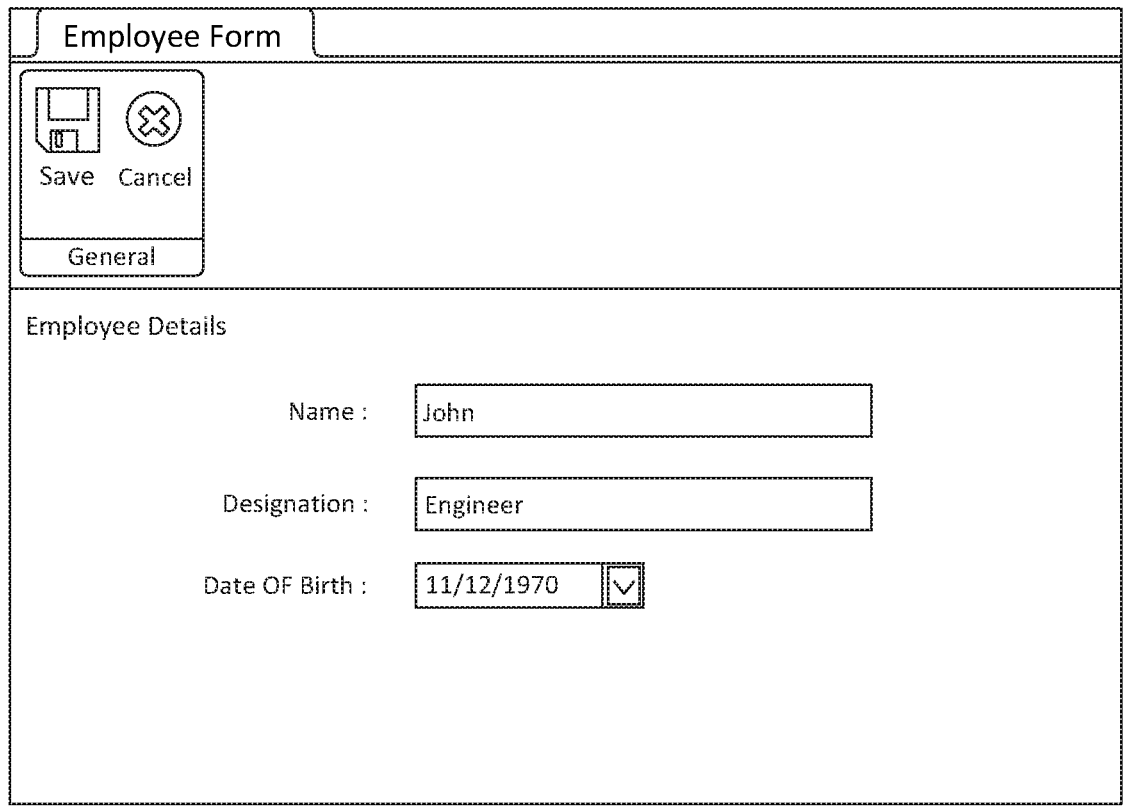
FIG. 7A illustrates a details report of a sample XML, in accordance with an embodiment.
Figure 7B:
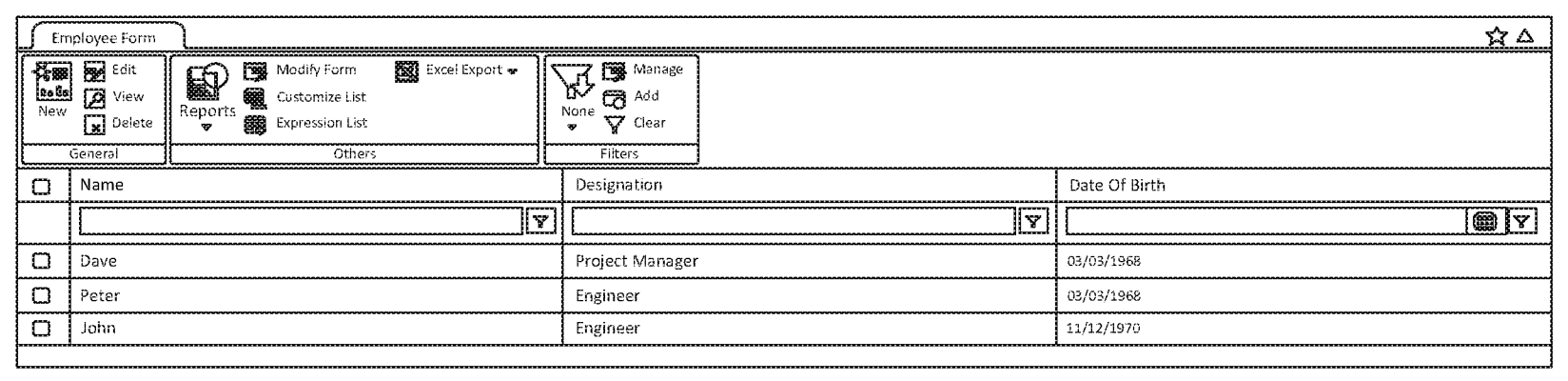

In an embodiment, an HTML rendering module of the rendering engine 108 renders the declarative XML file 104 in the form of HTML. FIGS. 7A and 7B illustrate screenshots of the details and the list page of a sample XML. These pages may be rendered in the host application.

In an embodiment, a JSON rendering module of the rendering engine 108 renders the data that is captured in the UI in the form of JSON. JSON format may be used by the integration APIs. Further, the JSON rendering module may render the declarative XML file 104 in JSON format.

In an embodiment, as shown below, an XML rendering module of the rendering engine 108 renders the data that is captured in the UI in the form of XML.

```
<EMPFORM>
   <ID>1</ID>
   <AUR_ModifiedBy>Peter Pettigrew</AUR_ModifiedBy>
   <AUR_ModifiedOn>11/09/2018 12:10:05 PM </AUR_ModifiedOn>
   <Name>John</Name>
   <Designation>Engineer</Designation>
   <DOB>11/11/1970 6:30:00 PM</DOB>
</EMPFORM>
```

In an embodiment, a report rendering module of the rendering engine 108 renders the report (list page or details, as example) in formats such as PDF or spreadsheet, among other formats.

In an embodiment, the declarative XML file 104 defines an API for integration with third party applications. The APIs can be used to perform the CRUD [Create, Read, Update, and Delete] operations. It may be noted that, for each API request, the processor module 12 may refer to the declarative XML file 104 to perform the CRUD operation. A sample API documentation to create or update instance is provided below.

```
Request
    URL
         <Site URL>/api/Module/CreateOrUpdateInstance
    Method
         POST
    Headers
         Authorization-Token : <Login Token>
         Content-Type : application/x-www-form-urlencoded;
         charset=UTF-8
    URL Params
         moduleId = "<Module ID>",
         jsonReqParams =
              "{
                   "pid":"<Project ID>",
                   "parentid":"<Contract ID>",
                   "context":"<Module ID>",
                   "InstanceId":"<0/Record Instance ID>"
              }"
    Data Params
         ={
              "<Primary Key Column>": "<0/Record Instance ID>",
              "<Column 1>" : "<Value 1>"
              "<Column 2>" : "<Value 2>"
         }
Response
    Success HTTP status 201 - Created
       "<Instance ID>"
```

Figure 9:
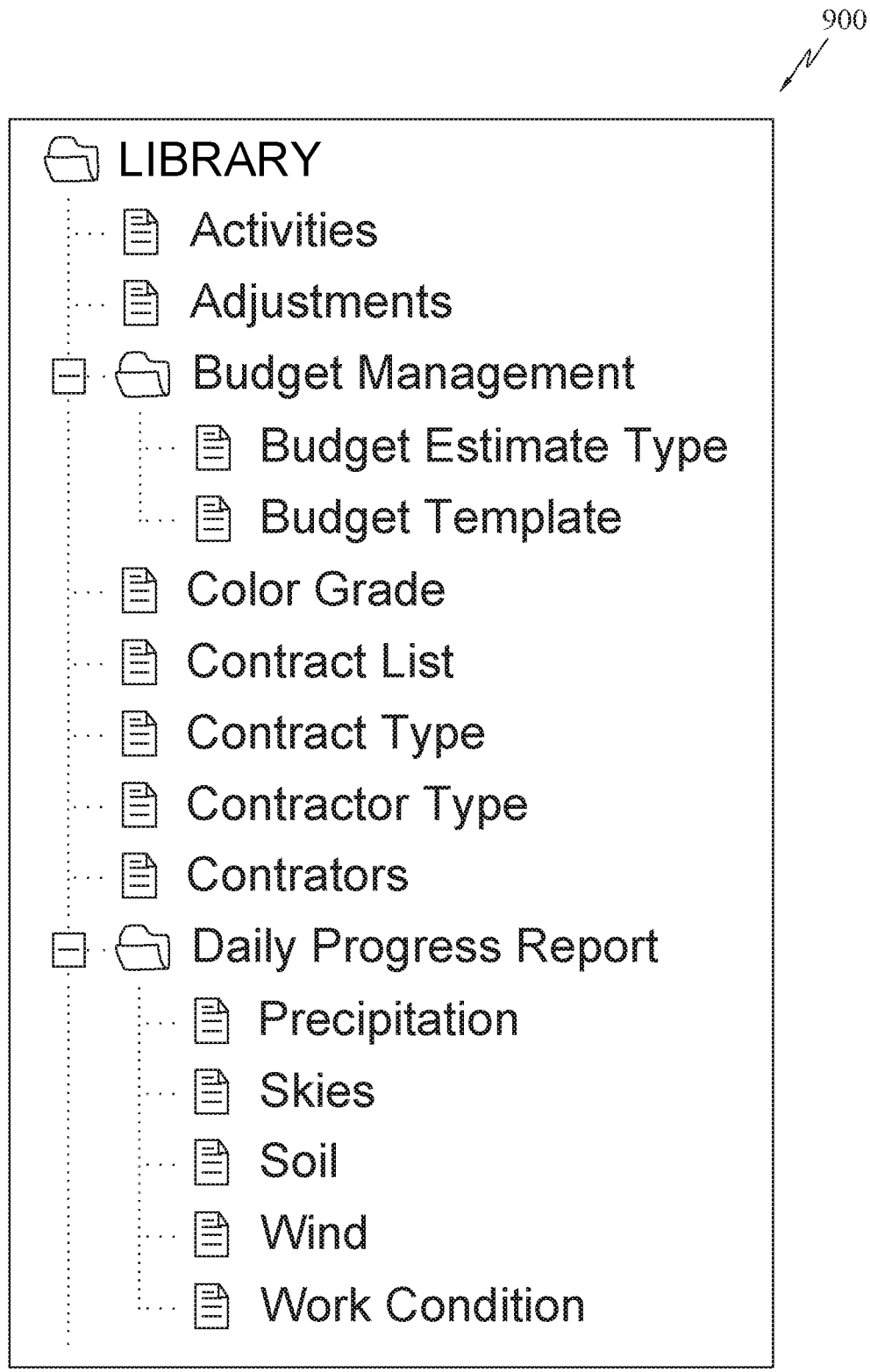
FIG. 9 illustrates a navigation tree 900 to be used in PDF, in accordance with an embodiment.

In an embodiment, the declarative XML file 104 defines a link in the navigation tree (refer FIG. 9) to navigate to the form user interface.

Figure 8:
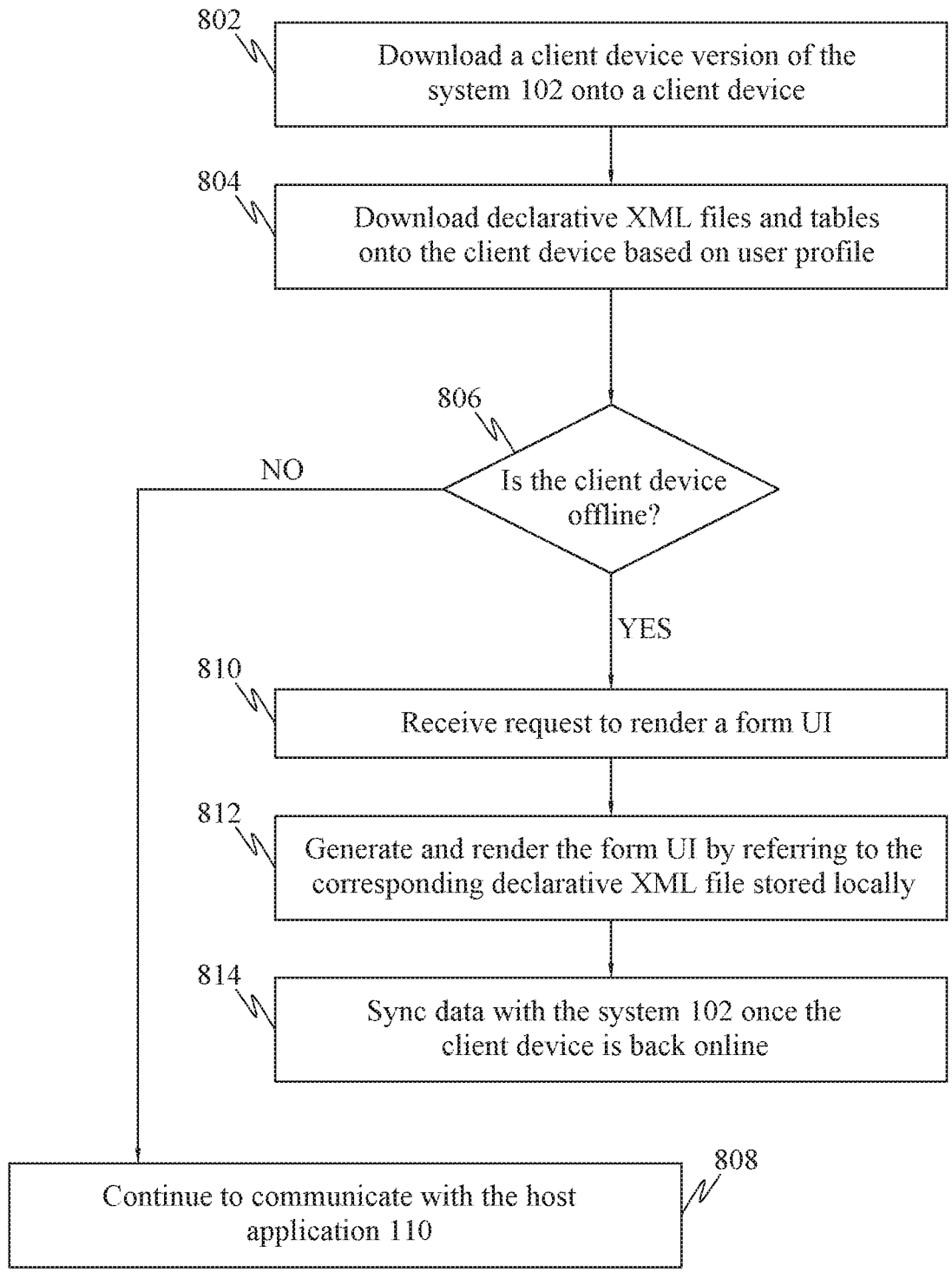
FIG. 8 is a flowchart of a method of offline functioning of the framework 100, in accordance with an embodiment.

Referring to FIG. 8, offline functioning of the framework 100 is discussed, in accordance with an embodiment. At step 802, a client device 114 may download and install a client device version (mobile application, as an example) of the system 102. While, the mobile application may not be configured to create new form UI (in offline mode), it may be configured to generate form UI of those forms for which the declarative XML files 104 are already published to the host application 116.

Once the mobile application is installed, the application may download data based on the user profile, at step 804. The data downloaded may be based on the permissions granted to the user. As an example, the user may have permission to a set of form and its associated data. The declarative XML files 104 corresponding to those set of forms may be communicated by the framework engine 106 to the client device 114, and stored locally in the client device 114. Further, the application may create tables locally as per the declarative XML files 104 and persist data within those tables.

In an embodiment, a declarative XML file 104 may identify a second form and data corresponding to a field in the second form, which has to be rendered in the form UI. In such a scenario, a declarative XML file required for generating the second form may also be stored locally on the client device 114 and data corresponding to the field, or the entire table of the second form, may be stored locally on the client device. Such data corresponding to the second form may be used when rendering the dependent form.

A user may access the application to request rendering of a form UI, as an example. In response, at step 806, the application may check whether the client device 114 is offline, which means internet access is absent. In case the client device 114 is not offline, then at step 808, the client device 114 or the application communicates with the system 102, as discussed earlier, to address the requests originating from the client device 114.

Alternatively, if it is determined that the client device is offline, at step 806, then the application may rely on the data stored on the client device 114 to cater to the requests of a user. As an example, the user may request a form UI at step 810. In response, at step 812, the application generates and renders the form UI by referring to the corresponding declarative XML file 104 and data stored locally. Any data that is added using the form is stored locally. Further, the application may keep checking whether the client device 114 is back online. Once the client device 114 comes back online, the application syncs with the system 102, causing the data stored locally to sync (two-way sync) with the corresponding table and files stored in the system 102.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

The example embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A system for software development, the system comprising at least one processor configured to:
   receive a declarative XML file as an input defining at least a structure of a form user interface and a structure of a database to store data received via the form user interface from the client device;
   create table, as per the declarative XML file, to persist the data captured from the form user interface;
   enable storage of the declarative XML file in a digital repository;
   receive a request to render the form user interface on a client device;
   generate the form user interface by referring to the declarative XML file, at each instance request is received from the client device to render the form user interface,
   receive modification to the declarative XML file;
   render the form user interface, which complies with the modified declarative XML file without code compilation, by referring to the modified declarative XML file, thereby making the modification hot deployable, wherein, the declarative XML file identifies a second form and data corresponding to a field in the second form, which has to be rendered in the form user interface; and
   render the data corresponding to the second form while rendering the form user interface.

2. The system of claim 1, wherein the declarative XML file defines validation for one or more fields in the form user interface from the client device.

3. The system of claim 1, wherein, the processor is configured to communicate the declarative XML file to the client device; and
   the client device stores the declarative XML file locally.

4. The system of claim 3, wherein the client device operating in an offline mode,
   generates the form user interface by referring to the declarative XML file stored locally;
   stores data received via the form user interface received in the offline mode in a table created locally as per the declarative XML file stored locally; and
   communicates the data in the table for remote storage, when the client device is back online.

5. The system of 3, wherein,
   a declarative XML file required for generating the second form is stored locally on the client device; and
   data corresponding to the field is stored locally on the client device.

6. The system of claim 1, wherein the processor is configured to output data in at least one of HTML, PDF, spreadsheet, XML or JSON format.

7. The system of claim 6, wherein the output data is a list presenting records created using the form user interface.

8. The system of claim 1, wherein the processor is configured to render the declarative XML file in JSON format.

9. The system of claim 1, wherein,
the declarative XML file defines an API for integration with third party applications;
the API is used to perform CRUD operations; and
for each API request, the processor refers to the declarative XML file to perform the CRUD operation.

10. The system of claim 1, wherein the declarative XML file defines a link in a navigation tree to navigate to the form user interface.

* * * * *